Patented May 29, 1945

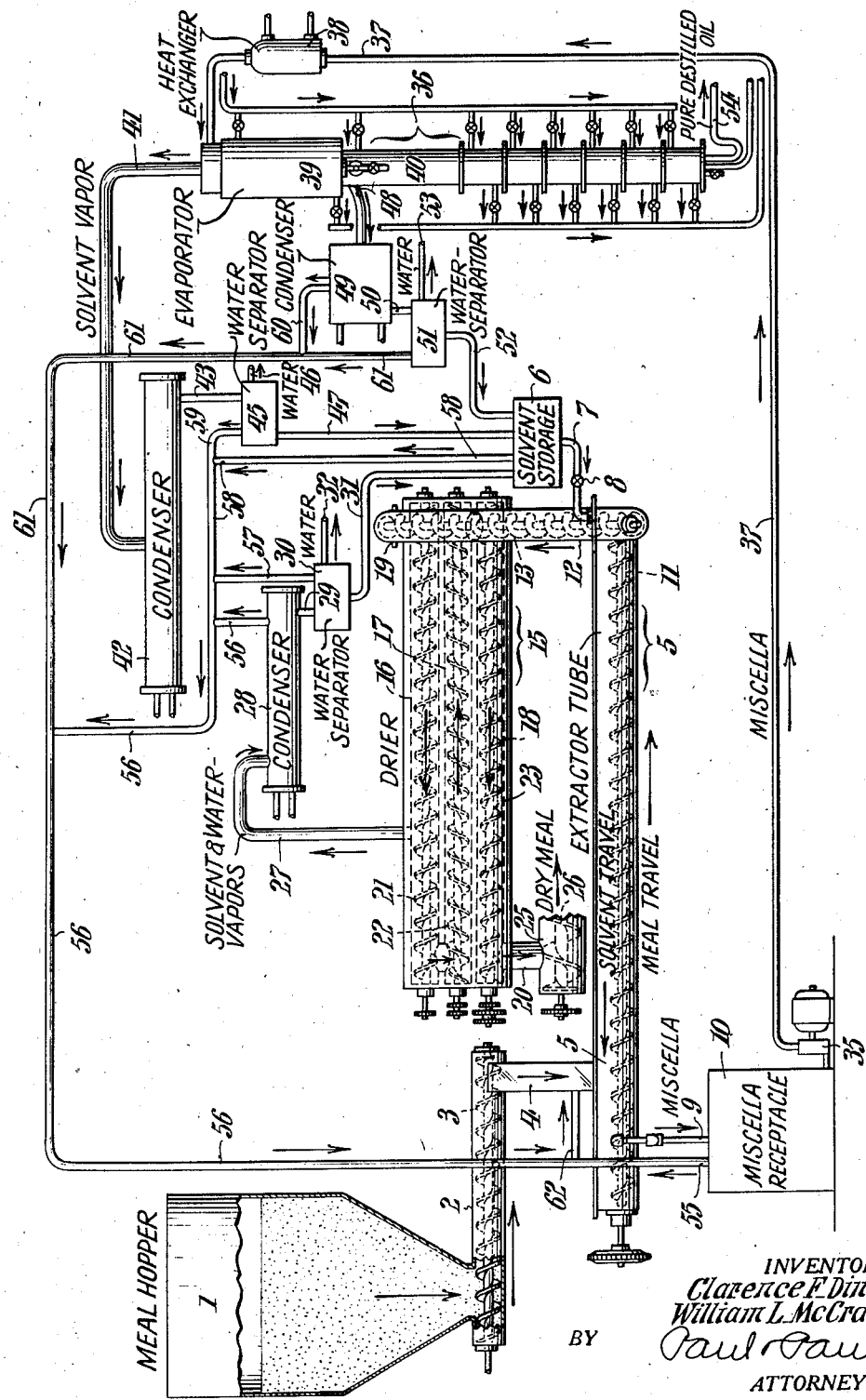

2,377,136

UNITED STATES PATENT OFFICE 2,377,136

EXTRACTION APPARATUS

Clarence F. Dinley and William L. McCracken, Detroit, Mich., assignors to Detroit Rex Products Company, Detroit, Mich., a corporation of Michigan Original application November 7, 1941, Serial No. 418,120. Divided and this application June 25, 1942, Serial No. 448,406

5 Claims. (Cl. 23—270)

The present application is a division of a copending application Serial No. 418,120, filed by us on November 7, 1941.

This invention relates to extraction apparatus useful in continuously extracting fats, oils, resins, etc., from flaked or otherwise comminuted or divided vegetable material, as, for example, oil from soya bean meal. More particularly it has reference to extraction apparatus wherein the dry comminuted material is fed from a storage supply into one end of a horizontal extractor tube and continuously advanced in the latter in one direction while suspended in a counter-flowing liquid solvent, and wherein after traversing the extractor tube, the meal is conducted to a drier, while the oil-laden liquid or miscella is continuously conveyed to a still for purification of the oil, heating of the leached meal in the drier and of the oil in the still being attended by evaporation of the entrained solvent and concurrent release of water vapor and any non-condensable gases, which may be present.

Our present invention is directed in the main toward making possible the complete recovery of the solvent volatized as above explained, and at the same time to eliminate the non-condensable gases which are released with the solvent vapors in different portions of the apparatus during the processing. This objective we realize in practice as more fully disclosed hereinafter through provision, in the apparatus, of a conduit system whereby the uncondensed and the non-condensable vapors are conducted from the regions of their origin in the apparatus and continuously injected into the dry unextracted meal supply so that they will be obliged to pass through the bed of the meal maintained in the feed hopper with the result that the solvent vapors are effectively scrubbed and retained either by adsorption and/or absorption, while the non-condensable vapors are vented directly to the atmosphere, the conduit system being so organized as to permit the apparatus to constantly breathe through the unextracted dry meal.

Other objects and advantages will appear from the following detailed description of the attached drawing which shows an extraction apparatus conveniently embodying our invention.

As herein shown, our improved apparatus includes a hopper 1 for the soya bean meal or other divided vegetable material from which the oil or other substance is to be removed. Connecting into the bottom outlet of the hopper is a horizontal delivery tube 2 into which the meal from the hopper is advanced at a uniform rate in the direction of the arrow by a constantly revolving Archimedean screw 3 to a discharge chute 4 which extends downward and connects with a comparatively long tube 5 in which the extraction is effected, at a point inward of the left-hand end of the latter. A suitable liquid solvent such as trichlorethylene flows continuously from a storage tank 6 by way of a pipe 7 and under regulated control of a hand valve 8, into the distal or right-hand end of the extractor tube 5; while the miscella is continuously screened and drained from the opposite end of said tube beyond the spout 4 through a pipe 9 and collected into a tank 10. The meal introduced into the tube 5 from the hopper 1 is loosely held in suspension in the solvent and advanced at a uniform rate toward the distal end of said tube counter to the fluid flow by a constantly rotating screw conveyer 11. Connecting with the right-hand end of the extractor tube 5 is an upwardly inclined tube 12 having a screw conveyer 13 therein whereby the leached material is lifted from said extractor tube and discharged into a drier comprehensively designated by the numeral 15. This drier 15 comprises a plurality of cylindric tubes 16, 17 and 18 which are arranged horizontally one above the other in spaced relation and which are serially connected. The leached material elevated in the lifting tube 12 is delivered into the top of the drier through an inlet 19 which connects into the right-hand end of the uppermost tube 16, and is discharged from the left-hand end of the lowermost tube 18 through an outlet neck 20. Disposed within the tubes 16, 17 and 18 of the drier 15 are feed screws 21, 22 and 23, respectively, all of which are rotated in the same direction, the intermediate one being pitched oppositely relative to the others so that the travel of the meal through the drier will be as indicated by the arrows. The tubes 16—18 of the drier are completely surrounded by a jacket in which saturated steam at a temperature sufficient to drive the solvent from the extracted material is continuously circulated. As shown, the outlet 20 from the drier discharges into one end of a delivery tube 25 which may extend to any desired point of disposal of the meal, and in which the meal is progressed by a continuously revolving feed screw 26. In practice, the feed screw 11 in the extractor tube 5 is driven at a somewhat faster rate than the feed screw 3 in the hopper discharge tube 2, the feed screw 13 in the lift tube 12 at a somewhat faster rate than the screw of the said extractor tube, the feed screws 16—16 in the drier at a somewhat faster rate than the screw in said lifting tube, and the feed screw 26 in the delivery tube 25 at a somewhat faster rate than the screws in said drier, so that clogging of the apparatus is definitely precluded. The water, solvent, and other vapors dissociated from the leached meal within the drier 15 escape through an outlet leading from the uppermost tube 16 of said drier, and are conducted, by way of a tube 27 to a condenser 28 which may be of any approved or well known type with a jacket for cold water circulation about its inner chamber. From the condenser 28 the condensate is conducted through a pipe connection 29 to a separator 30 which serves to isolate the solvent from the water, any condensed solvent which may be concurrently precipitated being conducted through a pipe 31 to the solvent storage tank 6 for re-use, and the water being carried off through a pipe 32. The miscella accumulating in the receptacle 10 is forced by a continuously operating motor-driven pump 35 into the top of a still 36 through piping 37 in which a suitable heat exchanger 38 is interposed to heat the miscella. As shown, the still 36 is in the form of a tower comprising an upper section or evaporator 39 and a lower section or stripper 40. The vapors dissociated from the miscella in the evaporated section 39 of the still 36 are conducted through a pipe 41 to another water cooled condenser 42 and from thence through a connection 43 to an associated water separator 45 having an outlet pipe 46 for water and an outlet pipe 47 by which the concurrently condensed solvent is carried back into the solvent storage tank 6 likewise for re-use. Vapors released from the miscella in the stripper section 40 of the still 36 are in turn conducted from the top of said section 40 by way of a lateral pipe 48 to a third condenser 49 which has a connection 50 to an associated water separator 51. The miscella separated in the separator 51 is conducted by way of a pipe 52 to the solvent storage tank 6 while the water is run off through a pipe 53. The solvent free oil is conducted from the bottom of the still 36 through a pipe 54 which may lead to a suitable point of final collection or disposal. Insofar as described up to this point, it will be seen that the illustrated apparatus is identical with that disclosed in the co-pending application, supra.

As hereinbefore pointed out, the present invention is concerned with the recovery of the solvent which may persist in vapor form in the different parts of the apparatus. To this end we provide a conduit system including branches 55, 56, 57, 58, 59, 60 and 61 which lead respectively from the miscella receptacle 10, the condenser 28, the separator 30, the solvent storage tank 6, the separator 45, the condenser 49, and the separator 51, all of said branches delivering to a pipe 62 which leads into the side of the chute 4, through which the dry meal is introduced into the extractor tube. In this way the vapors are caused to flow counter to the travel of the mass of dry meal in the chute 4 and the delivery tube 2, and the bed of the meal in the hopper, the solvent vapor content being thereby effectively scrubbed and adsorbed and/or absorbed by the dry meal, while the non-condensable gases are vented to the atmosphere. The apparatus is thus allowed to constantly "breathe" through the stored mass of unextracted dry meal in the hopper, notwithstanding any changes which may occur in the level of the liquid in the extractor tube, without loss of solvent. The pipe 62 may be connected into the dry meal supply at any other point along the line of feeding if this should be found more desirable or advantageous.

Our invention is of course not limited to the specific use herein described by way of example, but is applicable to the adsorption and/or absorption of any organic solvent from non-condensable gases such as benzene, hexane, and other petroleum fractions, carbon disulfide, acetone, etc. The appended claims are therefore to be interpreted with the immediately foregoing in mind.

Having thus described our invention, we claim:

1. In apparatus of the character described, a closed horizontal extraction channel having a conveyer therein; means for continuously introducing liquid solvent into one end of the channel; a miscella outlet at the opposite end of the channel so located that a free space of relatively large extent is left above the conveyer, with feed means on said conveyer constructed and arranged to extend above the solvent at intervals in the length of the channel; a closed receiver to which the miscella is delivered from said outlet; an open supply hopper with a downward delivery spout through which divided material is continuously discharged into the last mentioned end of the channel; a lift tube with a conveyer therein extending upwardly from the channel at the first mentioned end; dam and guide means at said first mentioned end of the channel constructed and arranged to direct the solid material downwardly toward the entrance of the lift tube with maintenance of a liquid seal; and a conduit system for continuously conducting solvent vapors from the miscella receiver into the delivery spout of the material supply hopper.

2. In apparatus of the character described, a closed horizontal extraction channel having a conveyer therein; means for continuously introducing liquid solvent into one end of the channel; a miscella outlet at the opposite end of the channel so located that a free space of relatively large extent is left above the conveyer, with feed means on said conveyer constructed and arranged to extend above the solvent at intervals in the length of the channel; a closed receiver to which the miscella is delivered from said outlet; an open supply hopper with a downward delivery spout through which divided material is continuously discharged into the last mentioned end of the channel; a lift tube with a conveyer therein extending upwardly from the channel at the first mentioned end; dam and guide means at said first mentioned end of the channel constructed and arranged to direct the solid material downwardly toward the entrance of the lift tube, with maintenance of a liquid seal; and a conduit system for continuously conducting solvent vapors from the solvent supply reservoir and the miscella receiver into the delivery spout of the material supply hopper.

3. In apparatus of the character described, a closed horizontal extraction channel having a conveyer therein; means for continuously introducing liquid solvent into one end of the channel; a miscella outlet at the opposite end of the channel so located that a free space of relatively large extent is left above the conveyer, with feed means on said conveyer constructed and arranged to extend above the solvent at intervals in the length of the channel; a closed receiver to which the miscella is delivered from said outlet; an open supply hopper with a downward delivery spout through which divided material is continuously discharged into the last mentioned end of the channel; a lift tube with a conveyer therein extending upwardly from the channel at the first mentioned end; a dam and guide means at said first mentioned end of the channel constructed and arranged to direct the solid material downwardly toward the entrance of the lift tube with maintenance of a liquid seal; a closed drier with a conveyer therein connected to the delivery end of the lift tube; and a conduit system for continuously conducting solvent vapors from the miscella receiver and the drier into the delivery spout of the material supply hopper.

4. In apparatus of the character described, a closed horizontal extraction channel having a conveyer therein; a supply reservoir from which liquid solvent is continuously introduced into one end of the channel; a miscella outlet at the opposite end of the channel so located that a free space of relatively large extent is left above the conveyer, with feed means on said conveyer constructed and arranged to extend above the solvent at intervals in the length of the channel; a closed receiver to which the miscella is delivered from said outlet; an open supply hopper with a downward delivery spout through which divided material is continuously discharged into the last mentioned end of the channel; a lift tube with a conveyer therein extending upward from the channel at the first mentioned end; a dam and guide means at said first mentioned end of the channel constructed and arranged to direct the solid material downwardly toward the entrance of the lift tube with maintenance of a liquid seal; a closed drier with a conveyer therein connected to the delivery end of the lift tube; and a conduit system for continuously conducting solvent vapors from the miscella receiver, the solvent supply reservoir, and the drier into the delivery spout of the material supply hopper.

5. In apparatus of the character described, a closed horizontal extraction channel having a conveyer therein; a supply reservoir from which liquid solvent is continuously introduced into one end of the channel; a miscella outlet at the opposite end of the channel so located that a free space of relatively large extent is left above the conveyer, with feed means on said conveyer constructed and arranged to extend above the solvent at intervals in the length of the channel; a closed receiver to which the miscella is delivered from said outlet; an open supply hopper with a downward delivery spout through which divided material is continuously discharged into the last mentioned end of the channel; a lift tube with a conveyer therein extending upward from the channel at the first mentioned end; dam and guide means at said first mentioned end of the channel constructed and arranged to direct the solid material downwardly toward the entrance of the lift tube, with maintenance of a liquid seal; a closed drier with a conveyer therein connected to the delivery end of the lift tube; a still; means for continuously conducting the miscella from the miscella receiver to the still; and a conduit system for continuously conducting solvent vapors from the solvent supply reservoir, the miscella receiver, the drier and the still into the delivery spout of the material supply hopper.

CLARENCE F. DINLEY.
WILLIAM L. McCRACKEN.